April 28, 1959

H. J. LOVENSTON 2,883,755

CALIBRATING MEANS FOR INDICATOR GAGES

Filed July 19, 1954

INVENTOR.
HANS J. LOVENSTON
BY
Barnes, Kisselle, Laughlin & Raisch
ATTORNEYS

INVENTOR.
HANS J. LOVENSTON
BY
ATTORNEYS

April 28, 1959 H. J. LOVENSTON 2,883,755
CALIBRATING MEANS FOR INDICATOR GAGES
Filed July 19, 1954 5 Sheets-Sheet 3

INVENTOR.
HANS J. LOVENSTON
BY
ATTORNEYS

April 28, 1959  H. J. LOVENSTON  2,883,755
CALIBRATING MEANS FOR INDICATOR GAGES
Filed July 19, 1954  5 Sheets-Sheet 4

INVENTOR.
HANS J. LOVENSTON
BY
ATTORNEYS

April 28, 1959

H. J. LOVENSTON 2,883,755

CALIBRATING MEANS FOR INDICATOR GAGES

Filed July 19, 1954

INVENTOR.
HANS J. LOVENSTON
BY
Barnes, Kisselle, Laughlin & Reich
ATTORNEYS

United States Patent Office 2,883,755
Patented Apr. 28, 1959

2,883,755

CALIBRATING MEANS FOR INDICATOR GAGES

Hans J. Lovenston, Detroit, Mich.; Bessie B. Lovenston, executrix of said Hans J. Lovenston, deceased, assignor, by mesne assignments, to Hanlo Gage Company, Detroit, Mich., a corporation of Michigan Application July 19, 1954, Serial No. 444,276

16 Claims. (Cl. 33—172)

This invention relates to indicator gages and more particularly to gages of the type that ordinarily require the use of a master set up block to calibrate the gage setting.

A conventional indicator type gage, for example, of the type shown in my Patent No. 2,661,539, dated December 8, 1953, is initially calibrated to the desired setting by securing the proper plunger extension to the gage unit and thereafter adjusting the indicator to read zero when the gage unit is positioned on a master gage block having the dimension desired to be gaged. In order to be sure that the gage is in proper adjustment, the user must from time to time set the gage unit on the master gage block and note the indicator reading. This procedure is time consuming, requires the provision of a master gage block with each indicator gage and must be exercised with extreme care in order to obtain precise calibration.

It is an object of this invention to produce a calibrating means for gages that require calibrating without the use of a separate master gage block.

A further object of the invention is to produce a calibrating means for indicator type gages which can be incorporated as an integral part of the gage or can be separate and usable with the gage.

A further object of this invention resides in the provision of a means for calibrating in a precise and positive manner and wherein the adjustment thereof can be verified in a minimum of time.

Another object of the invention is to provide a means which produces a self-calibrating effect on the gage without effort on the part of the operator and which enables the operation of gaging to be performed in a novel and efficient manner.

Figures 1, 2, 3, 3A, 3B:
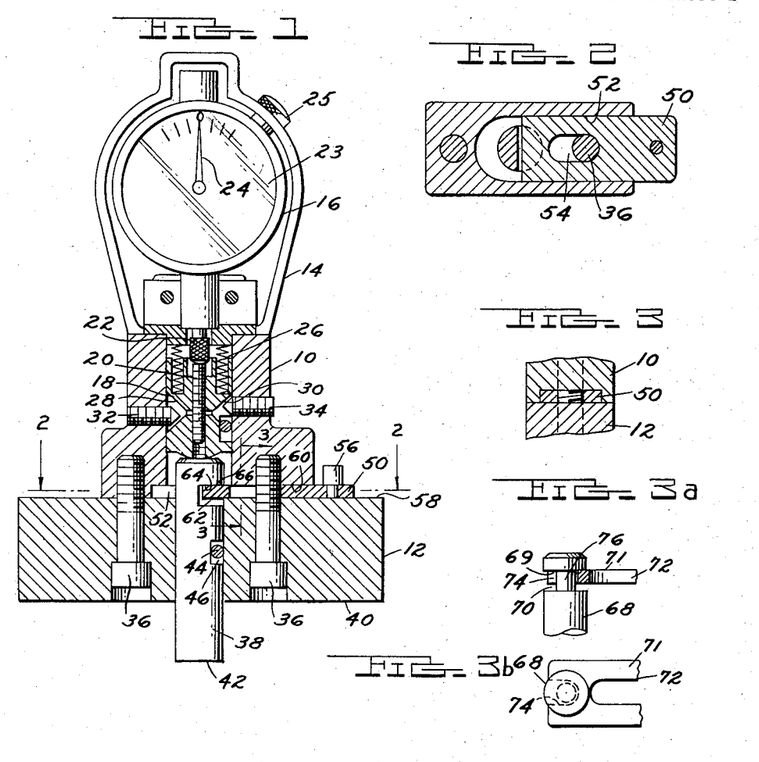
Fig. 1 is a vertical sectional view through a gage unit of the present invention with the calibrating slide assembly incorporated in the gage body.
Fig. 2 is a sectional view along the line 2—2 in Fig. 1.
Fig. 3 is a sectional view along the line 3—3 in Fig. 1.
Figs. 3a and 3b show a modified construction of plunger extension and slide plate usable with the gage shown in Fig. 1.

Referring to the drawings, there is illustrated in Fig. 1 a gage unit which includes a gage body 10 which is mounted on a base 12 and on which is mounted as by a bracket 14 a dial indicator 16. Within gage body 10, there is slidably arranged a plunger 18 having an adjusting screw 20 arranged to contact the end of stem 22 and thus cause the indicator pointer 24 to rotate when the plunger 18 moves axially within its bore in the body 10 of the gage unit. The dial 23 of indicator 16 is rotatably mounted on the housing of the indicator and may be locked in adjusted position by a thumb screw 25. Plunger 18 is biased downwardly in body 10 by a pair of compression springs 26. On opposite sides thereof, plunger 18 is provided with conical recesses 28 and 30 which are engaged by screws 32 and 34 respectively to control the extent of axial movement of plunger 18 in opposite directions within body 10 and thereby protect the delicate mechanism of the indicator against injury.

Base 12 is mounted on body 10 by a pair of cap screws 36. Within base 12, there is arranged a plunger extension 38, the upper end of which contacts the lower end of plunger 18. Plunger extension 38 moves along an axis perpendicular to the plane of the bottom face 40 of base 12. This bottom face 40 comprises a gaging surface of the gage, the other gaging surface being the lower end face 42 of extension 38. In checking the dimensions of a work piece, a suitable extension 38 is selected so that the indicator pointer 24 may be adjusted to read zero when the perpendicular distance between the surfaces 40 and 42 corresponds to the dimension of the work piece to be gaged. The extent of axial movement of extension 38 in base 12 is controlled by a pin 44 which rides in a slot 46 in extension 38.

The construction and operation of the general arrangement thus far described is illustrated and explained in greater detail in my Patent No. 2,661,539 dated December 8, 1953. The features with which the present invention is primarily concerned relate to a means built within the gage unit for enabling calibrating the gage and checking the setting of the indicator without the use of a separate master gage block. In the gage unit of the present invention, there is provided in the lower face of the gage body 10 a transverse guide slot 52 which receives a slidable plate 50. Side plate 50 is provided with an elongated opening 54 through which one of the cap screws 36 extends. The shank of cap screw 36 passing through the opening 54 cooperates with the opposite ends of the opening 54 to limit sliding movement of slide plate 50 in opposite directions. Knob 26 is provided on slide 50 to facilitate manual operation of slide 50 in transverse guide slot 52. The thickness and width of slide 50 corresponds to the dimensions of guide slot 52 in gage body 10 to obtain an accurate sliding fit between the top surface 58 of base 12 and the opposite face 60 in guide slot 52 when gage body 10 is rigidly fastened to base 22 with cap screws 36. It will be noted that gage body 10 is so constructed that the elongated opening 54 in slide 50 is covered when the slide is in the extreme outward position. This prevents any foreign matter from entering into opening 54 in slide 50.

Adjacent its upper end, plunger extension 38 is fashioned with a transverse slot 62, the upper face 64 of which is accurately machined and is arranged to engage with the upper face 66 of slide plate 50 when plate 50 is shifted inwardly to the position shown in Figs. 1 and 2. Plunger extension 38 is dimensioned such that when the parts are in the position illustrated in Fig. 1, that is, when the surface 66 of slide 50 is in co-planar engagement with the top face 64 of slot 62, the perpendicular distance between face 40 on the gage base and face 42 on the gage extension corresponds to the desired dimension of the work piece to be checked. Thus, to initially set the gage, the indicator dial 23 may be adjusted to read zero with the parts in the position illustrated in Fig. 1. Thereafter, if the extension 38 is pushed upwardly and slide plate 50 is shifted inwardly to engage in slot 62 and plunger extension 38 is thereafter released so as to move downwardly under the influence of springs 26 and thereby bring the face 64 thereof into co-planar engagement with the face 66 of slide 50, indicator pointer 24 will read zero if the gage unit is still calibrated properly. If the gage is out of adjustment, this fact will be brought to the attention of the user by reason of the pointer 24 reading other than zero on the indicator.

This arrangement not only provides a means integral with the unit for checking the adjustment of the gage, but also provides a novel method for gaging work pieces. For example, if the gage is used for checking a dimension having a tolerance of ±.0005″, the correct plunger extension 38 is selected and arranged in the gage. With the inner end of slide plate 50 engaged within notch 62, the indicator dial 23 is set with reference to pointer 24 to read the high limit of the tolerance; that is, the ±.0005 reading on the indicator dial. The operator then sets the gage on a work piece to be gaged. If the indicator pointer 24 moves to within the low limit of the tolerance, the operator knows that the dimension of the work piece is within the low limit. If the indicator pointer 24 does not move, it is indicative of one of two possibilities: The dimension of the work piece is either at exactly the high limit of the tolerance or it is beyond the high limit of the tolerance. Therefore, if the indicator pointer does not move, the operator simply pulls out the slide plate 50. If the indicator pointer 24 then moves, it rotates to a reading beyond the high limit; and if it does not move, it indicates that the dimension of the work piece is exactly at the high limit of tolerance. Thus, by keeping the slide 50 engaged within the slot 62 of the extension 38 and gaging in the manner herein described, the indicator calibrates itself each time it is lifted off a work piece; and the user is therefore continuously informed as to whether the gage is properly adjusted without any conscious effort on his part.

In the above described self-calibrating and gaging method, the slide 50 remains substantially in an inward position in engagement with slot 62. It is obvious, however, that the slide 50 can be moved outwardly after the initial calibration and remain in this position during the gaging operations. The slide 50 would then be moved inwardly into engagement with slot 62 at intervals only to check the initial calibration of the gage.

In Figs. 3a and 3b, there is illustrated a modified construction of the slide plate and plunger gage extension. In the arrangement shown in these figures, the plunger extension 68 is formed with an annular groove 70 adjacent its upper end and the slide plate 72 is formed with a U-shaped notch 74 at its inner end which engages in groove 70 to hold the plunger extension in the gage calibrating position. This construction, wherein the inner end of slide 72 straddles the stem 76 of extension 68, permits the downward force of the plunger 18 acting on gage extension 68 to be more uniformly distributed over the co-planar engaged surfaces 69 and 71 of the groove 70 and plate 72, respectively.

Figures 4, 5:
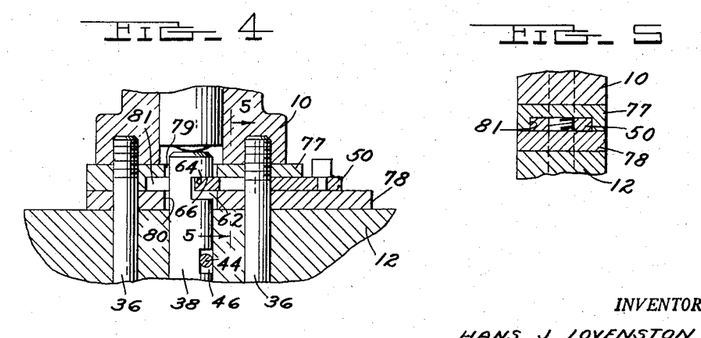
Fig. 4 is a fragmentary vertical sectional view of a conventional gage unit provided with calibrating means which are independent of the gage unit.
Fig. 5 is a sectional view along the line 5—5 in Fig. 4.

The arrangement illustrated in Figs. 4 and 5 is somewhat similar to that shown in Figs. 1, 2 and 3. However, the calibrating slide is not incorporated as part of the gage body 10. In this modification, a calibrating slide assembly consisting of a guide plate 77 and the slide plate 50 and also a wear plate 78 is mounted between the body 10 and base 12. Guide plate 77 and wear plate 78 are formed with apertures therein through which cap screws 36 extend to rigidly clamp the assembly between base 12 and body 10. Guide plate 77 and wear plate 78 are also formed with aligned apertures 79 and 80, respectively, through which gage extension 42 can move freely. The bottom face of guide plate 77 is fashioned with a slot 81 in which slide plate 50 has a nice sliding fit. The provision of wear plate 78 serves several purposes. In the first place, wear plate 78 is hardened and precision finished so that it provides a very desirable working surface for slide plate 50 in case the slide assembly is used in conjunction with a relatively soft base which does not offer a sliding surface for slide 50 of an accurate nature. Wear plate 78 also provides a very convenient means for increasing or decreasing the perpendicular distance between the end face 42 of gage extension 38 and the bottom face 40 of gage base 12.

The gage extensions are originally dimensioned in length to meet the dimensional requirements of a specific work piece to be gaged. If the dimensions of the work piece are changed slightly, then the gage must be correspondingly altered to accommodate for the dimensional change in the work piece. If the dimensional change requires a slightly shorter gage extension, this change can be met by grinding the required amount off the end of the gage extension to reduce the distance that the extension projects beyond the lower face 40 of the base 12. If the dimensional change in the work piece requires this dimension to be increased, then the extension must project a greater distance from the lower face of the gage base. This can be accomplished by removing sufficient material from either the surface 40 or the surface 58 of base 12. Obviously, removing metal from either of these two faces would be uneconomical. However, by providing the wear plate 78 shown in Figs. 4 and 5, it is obvious that the required amount of material can be removed from either face of this wear plate 78 with a minimum of cost; and thus, the distance that the gage extension protrudes beyond the lower face 40 of the base 12 can be increased as desired.

Figure 6:
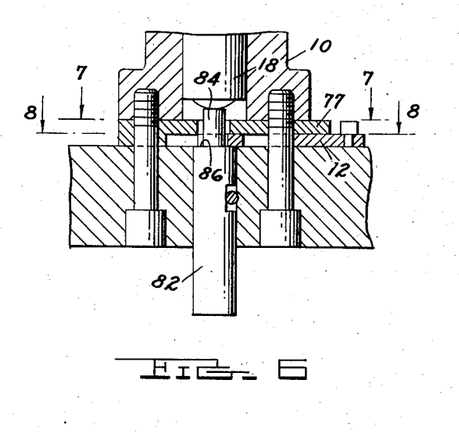
Fig. 6 is a fragmentary vertical sectional view of another modification of a gage calibrating assembly according to the present invention.
Figure 7:
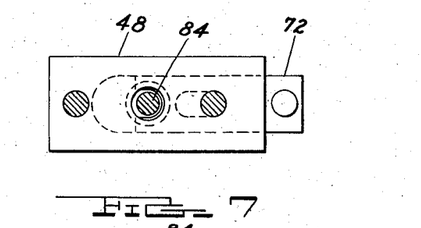
Figs. 7 and 8 are sectional views taken respectively along the lines 7—7 and 8—8 in Fig. 6.
Figure 8:
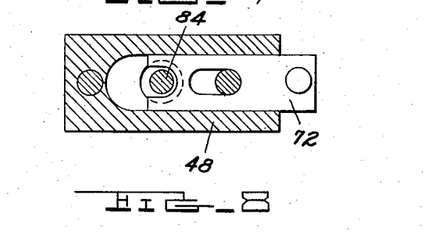

Referring now to Figs. 6, 7 and 8, there is shown a further modification of calibrating arrangement for an indicator gage. In the arrangement shown in these figures, the calibrating slide 72 is the same as that shown in Figs. 3a and 3b; and the guide plate 77 is the same as that shown in Figs. 4 and 5. The plunger extension 82 is fashioned with a reduced stem 84 at its upper end, the stem 84 forming with the body of extension 82 a flat shoulder 86 which is arranged to abut against the lower face of slide plate 72 when the plate is shifted inwardly to the position shown in Fig. 6. Thus, with this arrangement, the gage is calibrated by the upward movement of the plunger extension rather than by the downward movement of the plunger extension as is the case with the embodiments previously described. After the initial calibration, slide 72 is moved outwardly and out of engagement with shoulder 86 to permit free movement of the plunger extension 82 beyond the calibrating position during gaging periods.

Figures 9, 10, 11, 12, 13:
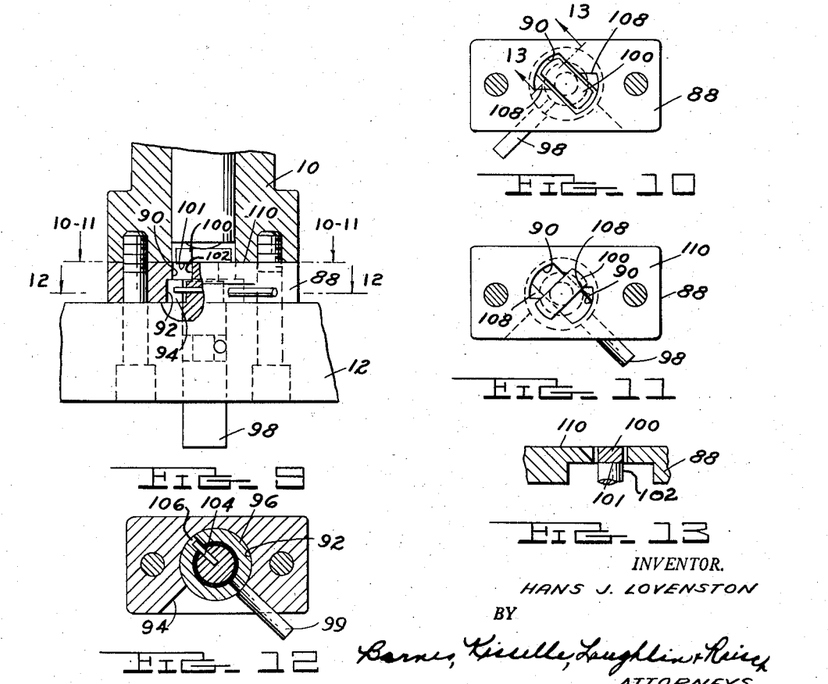
Fig. 9 is a fragmentary vertical sectional view of still another form of gage calibrating assembly according to the present invention.
Figs. 10, 11 and 12 are sectional views taken respectively along the lines 10—10, 11—11 and 12—12 in Fig. 9, the plunger extension in Fig. 10 being rotated through 90° from the position shown in Figs. 9, 11 and 12.
Fig. 13 is a sectional view along the line 13—13 in Fig. 10.

In Figs. 9 through 13, a somewhat different arrangement is shown for calibrating gages. In this arrangement, a housing 88 is interposed between gage body 10 and base 12. Housing 88 is provided with an opening 90 on its upper side and is counterbored adjacent the bottom end thereof as at 92. At one side thereof, the housing 88 is provided with an arcuate slot 94 which intersects counterbore 92. Within counterbore 92, there is rotatably arranged a bushing 96 provided with a handle 98 which projects outwardly of housing 88 through slot 94. The plunger extension 99 is provided with a flat sided, transversely extending lug 100 at its upper end. Lug 100 is connected with the body portion of extension 98 by a reduced stem portion 102 through which extends a pin 104. The outer free end of pin 104 is arranged for free vertical movement in a slot 106 formed in bushing 96. The opening 90 is shaped to receive the lug 100 at the upper end of extension 98 and is fashioned with inclined faces or ramps 108 which extend from the counterbore 92 to the upper face 110 of housing 88. The arrangement is such that when the extension 98 is disposed with lug 100 contacting the upper face 110 of housing 88 and extending in a direction transversely of the opening 90 as shown in Fig. 11 and the handle 98 is turned in a clockwise direction as viewed in Fig. 11, the opposite ends of lug 100 ride down the inclined faces 108 to a position where lug 100 is disposed within and aligned with opening 90 in housing 88; that is, to the position shown in Fig. 10. It will be noted that when the extension 98 is disposed in the position shown in Figs. 10 and 13, it is free to move up and down in base 12 for normal gaging movement. By the same token, when handle 98 is rotated in a counterclockwise direction, the opposite ends of lug 100 will ride up on the inclined surfaces 108 to bring lug 100 into calibrating position where it extends transversely of opening 90 as shown in Figs. 9 and 11. When it is desired to calibrate the gage to determine whether the indicator is still in proper adjustment, handle 98 is simply pivoted from the position shown in Fig. 10 to that shown in Fig. 11 wherein the calibrating surface 101 of lug 100 is brought into coplanar engagement with the calibrating surface 110 of housing 88.

Figure 14:
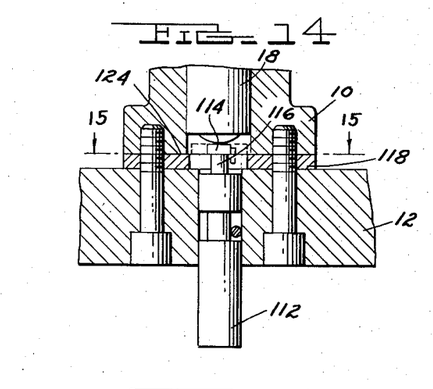
Fig. 14 is a fragmentary vertical sectional view through still another modification of gage calibrating assembly according to the present invention.
Figure 15:
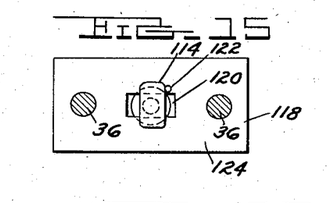
Fig. 15 is a sectional view along the line 15—15 in Fig. 14.

In Figs. 14 and 15, an arrangement somewhat similar in principle to that shown in Figs. 9 through 13 is illustrated. This arrangement is similar to that previously described with reference to Figs. 9 through 13 in that in both of these arrangements, the plunger extension is arranged to be shifted upwardly and rotated in order to calibrate the gage. The difference between these arrangements resides in the method of rotating the plunger extension to the calibrating and working position. In the instant arrangement, the plunger extension is rotated directly by hand.

The plunger extension 112 in Figs. 14 and 15 is formed with a lug 114 at its upper end and a reduced stem 116 which separates lug 114 from the body portion of extension 112. A calibrating plate 118 is interposed between base 12 and gage body 10. Calibrating plate 118 has formed therein a rectangular opening 120 shaped to receive lug 114 in one position. A stop pin 122 projects upwardly from the upper face 124 of plate 118 to limit the rotative movement of plunger extension 112. In the normal operating condition of the gage unit, lug 114 is aligned with rectangular opening 120 and thus, the extension 112 is permitted to shift freely upwardly and downwardly in base 12.

When it is desired to calibrate the gage shown in Figs. 14 and 15, extension 112 is shifted upwardly to a position wherein lug 114 is disposed above the upper face 124 of plate 118 and rotated 90° to a position where it contacts pin 122. The plunger extension 112 is then released, and the spring pressure on plunger 18 brings the lug into co-planar engagement with the upper face 124 of calibrating plate 118. If the gage is adjusted properly, the indicater pointer will at this time indicate zero or the other desired reading for which the indicator was initially set.

Figure 16:
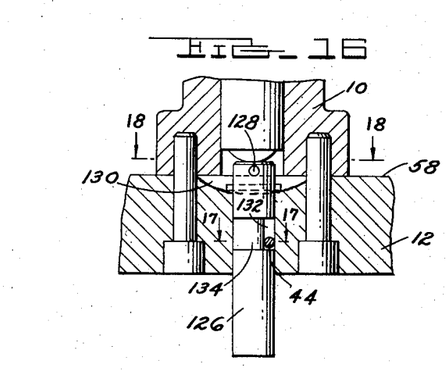
Fig. 16 is a fragmentary vertical sectional view through another modification of gage calibrating assembly according to the present invention.
Figure 17:
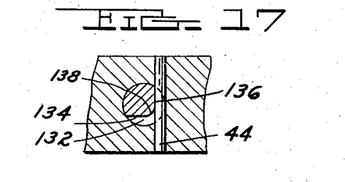
Figs. 17 and 18 are sectional views taken respectively along the lines 17—17 and 18—18 in Fig. 16.
Figure 18:
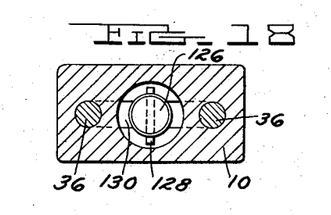

In the arrangement illustrated in Figs. 16 through 18, the gage body 10 is mounted directly on the upper face 58 of base 12. At the upper end of plunger extension 126, there is arranged a pin 128 which extends transversely of the axis of gage extension 126. The upper face 58 of base 12 is provided with a longitudinally extending slot 130 which is adapted to receive pin 128 when the pin is aligned therewith. Thus, in the calibrating position, pin 128 engages the top face 58 of base 12; and when rotated 90° from this position, pin 128 is aligned with slot 130 and thereby enables gage extension 126 to move freely upwardly and downwardly in base 12. In order to limit the rotative movement of gage extension 126 to the two positions of pin 128, a portion intermediate the ends of extension 126 is formed with a groove 132 which defines on the shank of extension 126 a pair of perpendicularly disposed faces 134 and 136 connected by a rounded corner portion 138. Pin 44 extending transversely through base 12 and slot 132 engages face 134 or 136 to limit the rotative position of extension 126 to either of the two desired positions of pins 128.

Figure 19:
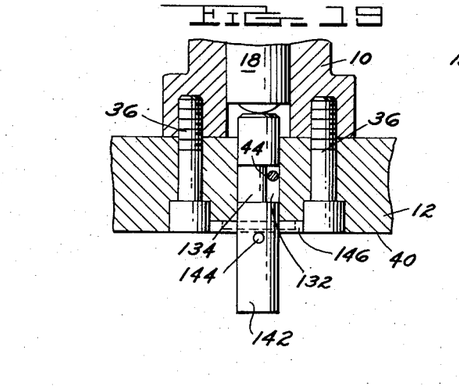
Fig. 19 is a fragmentary vertical sectional view of another modification of gage calibrating assembly according to the present invention.

In Fig. 19, a unit which is generally the reverse of that shown in Figs. 16 through 18 is illustrated. In this arrangement, the plunger extension 142 is provided with a transversely extending pin 144 which is adapted in one position to abut against the bottom face 40 of base 12. When the plunger extension 142 is rotated through 90°, pin 144 is brought into registry with a slot 146 on the bottom face 40 of base 12 in which position the plunger extension 142 is in condition for gaging. When it is desired to calibrate the unit, plunger extension 142 is rotated to position the pin 144 transversely of slot 146 and then is shifted axially upwardly to bring pin 144 into engagement with the bottom face 40 of base 12.

Figure 20:
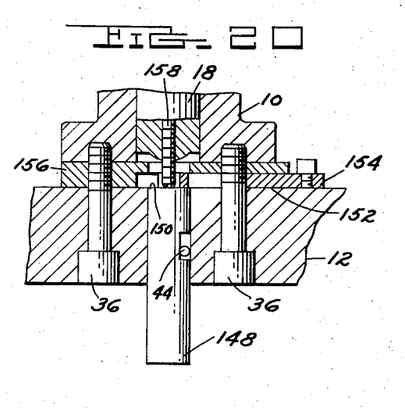
Fig. 20 is a fragmentary vertical sectional view through still another form of gage calibrating assembly according to the present invention.
Figures 21, 22, 23, 24:
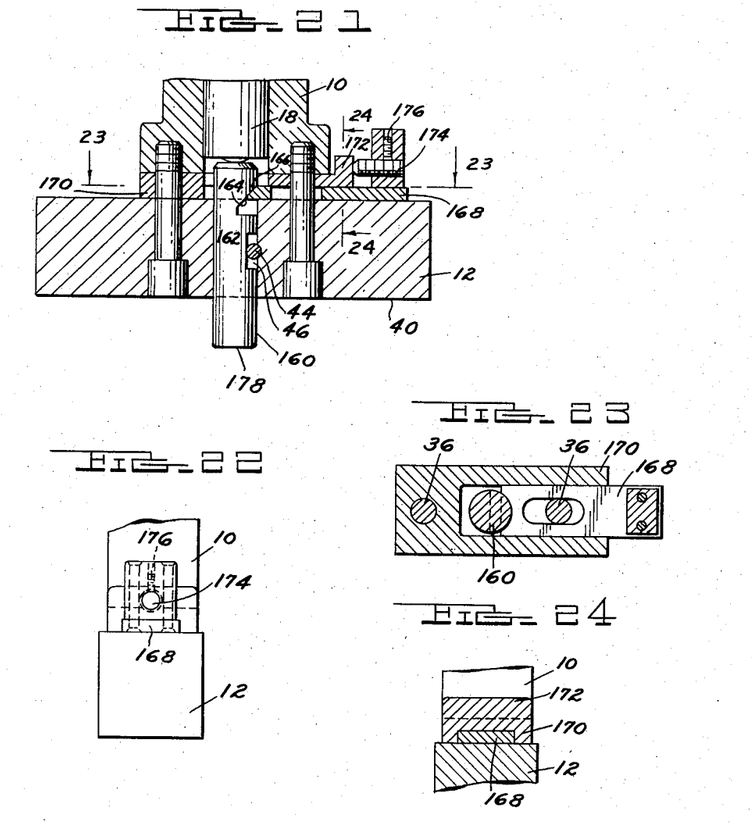
Fig. 21 is a fragmentary sectional view of another modification of gage calibrating assembly according to the present invention.
Fig. 22 is an end view of the arrangement shown in Fig. 21.
Figs. 23 and 24 are sectional views taken respectively along the lines 23—23 and 24—24 in Fig. 21.

The arrangement illustrated in Fig. 20 is somewhat similar in principle to that shown in Figs. 6, 7 and 8. The difference resides primarily in the construction of the inner end of plunger extension and the contact point of gage plunger 18. In Fig. 20, the plunger extension 148 is fashioned with a perfectly flat upper end face 150 which is arranged to abut against the bottom face 152 of a calibrating slide plate 154. Plate 154 is arranged within a guide plate 156 which is interposed between the body 10 and base 12 of the gage unit. Gage plunger 18 within body 10 is provided with a stem for contacting the upper face of extension 148. In the form illustrated in Fig. 20, this stem comprises a screw 158. It will be appreciated, however, that the stem may be formed as an integral reduced extension of plunger 18. When plunger 148 is shifted upwardly to a position where the upper end face 150 thereof abuts against the lower face 152 of calibrating plate 154, the gage unit is in the calibrating position;

and whether the gage is properly adjusted can be visually ascertained by noting the reading on the indicator dial.

Referring now to Figs. 21 through 24, the arrangement therein illustrated enables adjustment of the gage unit to compensate for dimensional changes that may be made from time to time in the work piece being gaged. In this arrangement, the plunger extension 160 is provided with a notch 162 at one side thereof which is defined in part by a face portion 164 inclined to the axis of extension 160. Face portion 164 is arranged to be engaged by a similarly inclined face portion 166 at the inner end of a slide plate 168 which is guided within a guide plate 170. Guide plate 170 is provided with an abutment 172 which forms a stop for an adjusting screw 174 on slide plate 168. Adjusting screw 174 is arranged to be locked in an adjusted position by a lock screw 176. With this arrangement, when the slide plate 168 is shifted inwardly to interengage surfaces 164 and 166, adjusting screw 174 may be turned in either one direction or the other to thereby raise or lower extension 160 to a position wherein the perpendicular distance between the lower face 40 of base 12 and the lower end face 178 of extension 160 is the required distance to be gaged. Thus, with this arrangement, if a dimensional change is made on the work piece, the locking screw 176 can be loosened and screw 174 can be rotated either one direction or the other to compensate for the dimensional change.

Figure 25:
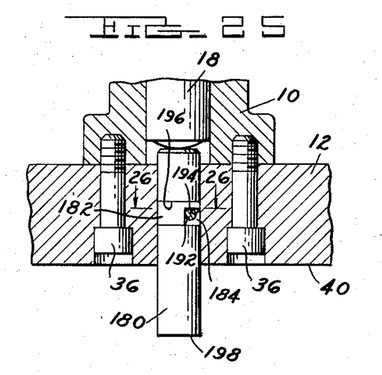
Fig. 25 is a fragmentary vertical sectional view through another modification of gage calibrating assembly according to the present invention.
Figure 26:
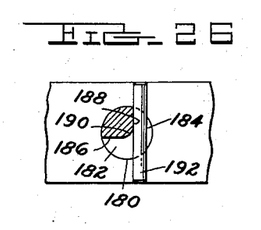
Fig. 26 is a sectional view along the line 26—26 in Fig. 25.

In Figs. 25 and 26, there is illustrated another modification of a calibrating means for an indicator gage. In this arrangement, as in others previously described, the plunger 18 within body 10 of the gage contacts directly the upper end of extension 180 which is slidably mounted in base 12. Base 12 is secured directly to the bottom face of body 10 by screws 36. An intermediate portion of plunger extension 180 is formed with two intersecting, perpendicularly related transverse grooves 182 and 184 which define perpendicularly related faces 186 and 188 connected by a rounded corner portion 190. A pin 192 extending through body 12 is arranged to engage either of faces 186 or 188 to limit the rotative movement of extension 180. The upper surface 194 of groove 184 is positioned below the upper face 196 of groove 182. The arrangement is such that when the surface 194 is engaged with the pin 192, the gage is in the calibrating position wherein the end face 198 of extension 80 extends the desired predetermined distance from the gaging face 40 of base 12; and in this position, the dial on the indicator is set to read zero or to any other desired reading with reference to the pointer of the indicator. When the plunger extension 180 is rotated 90° to a position wherein pin 192 engages the face 186, the gage is in working position and the extension 180 is free to travel downwardly beyond the calibrating position shown in Fig. 25. At intervals during the gaging process, the extension 180 is rotated 90° to bring the calibrating surface 194 into contact with pin 192. With the plunger extension 180 in this position, the indicator reading is observed and it can be readily determined whether the gage is properly calibrated.

Figure 27:
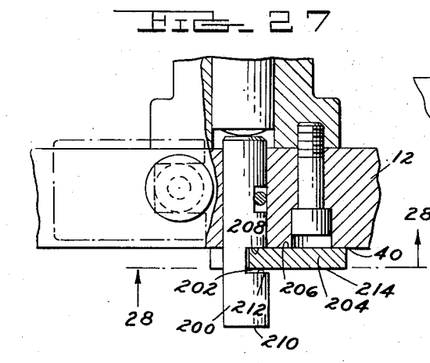
Fig. 27 is a fragmentary vertical sectional view through another modification of gage calibrating assembly according to the present invention.
Figure 28:
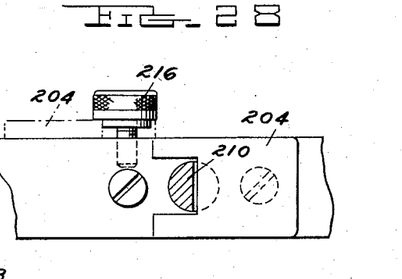
Fig. 28 is a sectional view along the line 28—28 in Fig. 27.

In Figs. 27 and 28, another modification is illustrated. In this arrangement, the plunger extension 200 is formed with a slot 202 which is arranged to be engaged by a calibrating plate 204. Plate 204 is adapted to be manually positioned against the bottom face 40 of base 12. The position of slot 202 may be determined such that when the upper surface 206 of plate 204 is in co-planar engagement with the upper face 208 of slot 202, the end face 210 of extension 200 is spaced the desired predetermined distance from the lower face 40 of base 12.

It is apparent that, with reference to Figs. 27 and 28, if desired, the gage may be calibrated by holding the calibrating plate 204 against the bottom face 40 of base 12 and in engagement with slot 202 and then positioning extension 200 inwardly. If this latter method of calibrating is adopted, then slot 202 is located on extension 200 such that when the lower face 212 of extension 200 is brought into co-planar engagement with the lower face 214 of calibrating plate 204, the perpendicular distance between the end face 210 of extension 200 and the bottom face 40 of base 12 corresponds to the distance to be gaged. If desired, a thumb screw 216 may be threadedly mounted on the side of base 12 for clamping plate 204 to the side face of base 12 when not in use as illustrated in broken lines.

It will also be noted that if it becomes necessary to decrease the gaging distance between the end face 210 of extension 200 and the bottom face 40 of base 12 due to a minor change in dimensional requirements, this change can be accommodated in most instances either by grinding one face of the plate 204 or by grinding the face 208 or 212, depending upon the direction of movement of plunger 200 to the calibrating position.

Figure 29:
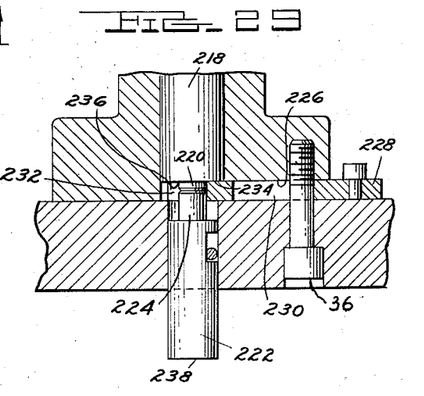
Fig. 29 is a fragmentary sectional view of another modification of gage calibrating assembly according to the present invention.

In the modification of the invention illustrated in Fig. 29, the plunger 218 in the body 10 of the gage is fashioned with a reduced stem 220 at its lower end. The gage extension 222 in base 12 is likewise fashioned with a reduced stem portion 224 at its upper end. The portions 220 and 224 are axially aligned and preferably of approximately the same diameter. Base 10 is fashioned on its bottom face with a groove 226 in which a calibrating slide plate 228 is movable. Slide plate 288 is similar in construction to plate 72 illustrated in Figs. 3a and 3b. One of the screws 36 which are employed for connecting body 10 with base 12 extends through an elongated opening 230 in calibrating slide plate 228 and cooperates with the ends of this opening to limit the movement of plate 228 in an outwardly and inwardly direction. At its inner end, plate 228 is provided with a yoke portion 232 which is adapted to straddle the stem portion 220 at the lower end of plunger 218. The top face 234 of plate 228 and the face 236 adjacent the stem portion 220 are accurately machined so that with the parts in the position illustrated in Fig. 29 wherein the upper face portion 234 of plate 228 is in co-planar engagement with the face 236 of the plunger 218 and the upper end of stem 224 contacts the lower end of stem 220, the perpendicular distance between the face 40 and the end face 238 of plunger 222 corresponds exactly to the dimension being gaged. With the parts in this position, the dial of the indicator is set to read zero with reference to the indicator pointer or any other predetermined reading.

In the arrangement shown in Fig. 29, it will be observed that one of the calibrating surfaces, namely, the surface 236, is located on the plunger itself within the gage body. In all the previous embodiments, calibration is effected in connection with a calibrating surface on the gage extension. When the calibrating surface is located on the extension as distinguished from the plunger itself, it will be noted that any wear or "brinelling" at the connection between the indicator stem and the gage plunger or between the gage plunger and the gage extension will in no way affect the calibration of the gage because the critical dimension between the calibrating slide plate or other calibrating surface disclosed and the gaging surface at the extreme end of the gage extension remains constant.

It will also be evident from the foregoing description that, with the exception of the gages illustrated in Figs. 19 and 27, the contact surfaces which are arranged to interengage when calibrating the gage are at all times enclosed within a confined chamber. Thus, these functional surfaces are free of dust, dirt and any foreign matter would impair the accuracy of calibration. One of the objections with calibrating the gage setting with a conventional type master gage block is the difficulty of keeping the functional calibrating surfaces clean under ordinary shop conditions. In addition, this procedure is time consuming and calibration must be exercised with great care. It is further evident that the elimination of a costly master gage block results in great economy.

Furthermore, it will observed that gages of the present invention are self-contained. The calibration is accomplished in a positive foolproof manner by bringing a surface on a functional gaging member into co-planar engagement with a surface on a well supported calibrating member. It is further evident that this calibrating means in various modified forms can be adapted to a great variety of gages where calibration is essential.

I claim:

1. A gage unit for use with an indicator comprising a body having a planar gaging surface, a plunger axially movable in said body in a direction perpendicular to said gaging surface, said body having means for mounting an indicator thereon, means for effecting an operative connection between said indicator and said plunger, said plunger having a free end extending beyond said gaging surface, said plunger being rotatable on its axis in said body, said plunger having a non-circular portion and said body having a non-circular opening therein through which said non-circular portion of the plunger is movable when said opening and said non-circular portion are in registration and said plunger is shifted axially in said body, said plunger being rotatable to position said non-circular portion of the plunger out of registration with said non-circular opening, said non-circular portion, when out of registration with said non-circular opening, abutting against the portion of said body adjacent said non-circular portion to limit the axial movement of the plunger in one direction to a position wherein the perpendicular distance between said gaging surface and said free end of said plunger corresponds to the dimension being gaged.

2. The combination called for in claim 1 including means on said body for limiting the rotative movement of said plunger through an arc of about 90° from the position wherein said non-circular portion of the plunger is in registry with the non-circular opening in said body.

3. The combination called for in claim 2 wherein said last mentioned means engages said plunger to limit the axial movement thereof.

4. The combination called for in claim 1 wherein said body is provided with a lateral slot extending through one side thereof to said plunger, a handle member extending through said slot and having an operative connection at its inner end with said plunger, said handle being movable across the extent of said slot to rotate said plunger to and from said position wherein said non-circular portion of the plunger is in registry with said non-circular opening in the body and means responsive to the rotative movement of said plunger for shifting the plunger axially.

5. In combination, an indicator gage, a support for said indicator gage, said support having a gaging surface and also having a plunger thereon axially movable to a position wherein one end of the plunger is spaced from the plane of said gaging surface, the extreme end face of said end of said plunger forming a gaging surface, means forming an operative connection between the indicator gage and the other end of said plunger, whereby axial movement of the plunger produces a corresponding change in the reading of the indicator gage, an abutment on said plunger and an abutment on said support, said abutments interengaging in one position of the plunger to limit the axial movement of the plunger in one direction to a predetermined fixed position wherein the distance between said gaging surfaces corresponds exactly to the dimension to be gaged, said plunger being rotatable about its longitudinal axis to a position wherein said abutments are interengaged and rotatable to another position wherein said abutments are in bypassing relation to permit said plunger to move in said one direction to a position beyond said fixed position.

6. In combination, a gage unit comprising a body, an indicator gage mounted on said body, a support, said gage unit being mounted on said support, said support having a gaging surface thereon, a plunger on said body movable axially to a position wherein one end of the plunger is spaced from the plane of said gaging surface, means within said body forming an operative connection between the indicator gage and the other end of said plunger, whereby axial movement of the plunger produces a corresponding change in the reading of the indicator gage, an abutment on said plunger and an abutment on said support, said abutments interengaging in one position of the plunger to limit the axial movement of the plunger in one direction to a predetermined fixed position wherein the distance between the first mentioned end of the plunger and said gaging surface corresponds exactly to the dimension to be gaged, said plunger being rotatable about its longitudinal axis to a position wherein said abutments are interengaged and rotatable to another position wherein said abutments are in bypassing relation to permit said plunger to move in said one direction to a position beyond said fixed position.

7. A gage unit for use with an indicator gage comprising a body having means thereon for detachably mounting an indicator gage thereon and having a planar face, a base member having a planar face, said body being detachably mounted on said face of said base member, an axially slidable plunger on said base member, means within said body for operatively and adjustably connecting said indicator gage with said plunger, whereby axial movement of the plunger produces a corresponding change in the reading of said indicator gage, a stop assembly removably mounted between and in coplanar engagement with said planar faces of said body and base member, said assembly including a stop plate, said plunger and said stop plate having cooperating abutments thereon, one of said abutments being movable to a position such that the abutments interengage when the plunger is moved axially in one direction to limit the extent of axial movement of the plunger in said one direction to a predetermined position wherein the free end of the plunger is spaced a very accurate distance from a reference point on said base, said movable abutment being movable to a second position wherein said abutments are in bypassing relation to permit further movement of said plunger in said one direction.

8. The combination set forth in claim 7 wherein said stop assembly includes a guide plate enclosing and forming a rectilinear guideway for said stop plate, said guide plate having parallel faces in coplanar engagement with said planar faces of said body and base, said stop plate being slidbly arranged within said guideway for movement in a rectilinear path transversely of the axis of the plunger and into the path of movement of the plunger, said plunger having a shoulder thereon and said stop plate having a portion forming said abutment engageable with said shoulder in one position of the stop plate to limit the movement of the plunger to said predetermined position.

9. The combination set forth in claim 7 wherein said stop assembly also includes a guide plate having a rectilinear guideway therein, said stop plate being slidably arranged in said guideway, said plunger projecting through said guideway adjacent its operative connection with said indicator gage and having a shoulder therein engageable with the stop plate to limit the axial movement of the plunger to said predetermined position, said stop plate being retractable in said guideway to a position wherein the shoulder on the plunger moves past the guide plate.

10. The combination set forth in claim 7 wherein said plunger is freely movable in the opposite direction from said position wherein said shoulder is engaged with said stop plate.

11. A gage unit for use with an indicator gage comprising a body having means thereon for detachably mounting an indicator gage thereon, said body having an accurately machined planar face, a base member having an axially movable plunger therein, said base member having an accurately machined planar face, said planar faces extending perpendicular to the axis of said plunger, means removably securing said body on said base member with said faces disposed adjacent one another in parallel relation, said plunger projecting at one end through said accurately machined face of said base member, means within said body for operatively and adjustably connecting said end of the plunger with said indicator gage, a stop assembly disposed between said accurately machined faces, said stop assembly including a stop plate slidably arranged between said faces for movement into and out of the path of movement of said plunger, said plunger having a shoulder thereon engageable with said stop plate when the stop plate is moved into the path of movement of the plunger to limit the axial movement of the plunger in one direction to a position wherein the opposite end of the plunger is spaced from a reference plane on said base the exact dimension to be gaged.

12. The combination set forth in claim 11 including a wear plate disposed between said stop plate and said base member, said wear plate having one face slidably engaged by said stop plate and having an opposite parallel face in coplanar engagement with the accurately machined surface of said base member.

13. The combination set forth in claim 11 including means biasing said plunger in said one direction such that said shoulder interengages said stop plate when the stop plate is shifted into the path of movement of the plunger, said plunger being freely movable in the opposite direction against the influence of said biasing means from said position wherein said shoulder engages said stop plate.

14. The combination set forth in claim 11 wherein said stop assembly also includes a guide plate having opposite parallel faces in coplanar engagement one with the accurately machined face of said base and the other with the accurately machined face of said body, said guide plate having a rectilinear guide therein, said stop plate being movable in said rectilinear guide into and out of the path of movement of said plunger.

15. The combination set forth in claim 14 wherein said shoulder has a portion inclined to the axis of the plunger, said stop plate having an end portion engageable with said inclined portion of said shoulder to limit the axial movement of the plunger in said one direction and means for adjustably controlling the extent to which said end of the stop plate is movable into the path of movement of the plunger.

16. A gage unit for use with an indicator gage comprising a body adapted to have an indicator gage detachably mounted thereon, a base member, said body being detachably mounted on one face of said base member, an axially slidable plunger on said base member, means within said body for operatively and adjustably connecting said indicator gage with said plunger, whereby axial movement of the plunger produces a corresponding change in the reading of said indicator gage, a stop assembly removably mounted between said body and base member at said face of said base member, said assembly including a stop plate, said plunger and said stop plate having cooperating abutments thereon, one of said abutments being movable to a position such that the abutments interengage when the plunger is moved axially in one direction to limit the extent of axial movement of the plunger in said one direction to a predetermined position wherein the free end of the plunger is spaced a very accurate distance from a reference point on said base, said movable abutment being movable to a second position wherein said abutments are in bypassing relation to permit further movement of said plunger in said one direction, said plunger being rotatable about its axis and said stop plate being fashioned with a non-circular opening adapted to pass said abutment on the plunger in one rotative position of the plunger, the abutment on the plunger interengaging a portion of said stop plate adjacent said opening therein in another rotative position of the plunger.

References Cited in the file of this patent

UNITED STATES PATENTS

| Number | Name | Date |
|---|---|---|
| 2,113,414 | Stowell | Apr. 5, 1938 |
| 2,303,858 | Ostberg | Dec. 1, 1942 |
| 2,324,998 | Dague | July 20, 1943 |
| 2,661,539 | Lovenston | Dec. 8, 1953 |